UNITED STATES PATENT OFFICE.

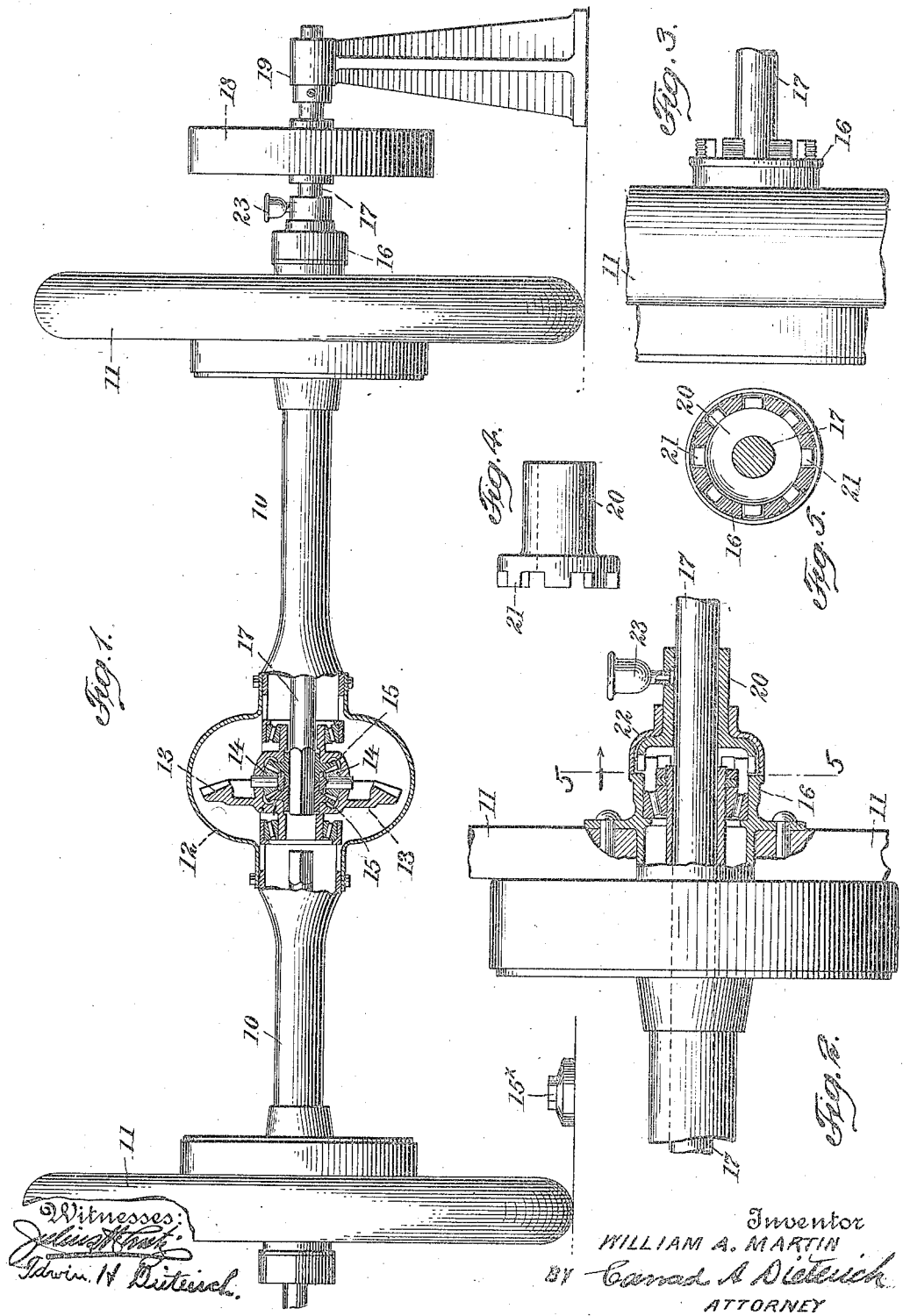

WILLIAM A. MARTIN, OF HOPEWELL JUNCTION, NEW YORK.

POWER-TRANSMITTING ATTACHMENT FOR AUTOMOBILES.

1,184,765.  Specification of Letters Patent.  Patented May 30, 1916.

Application filed January 22, 1912. Serial No. 672,579.

*To all whom it may concern:*

Be it known that I, WILLIAM A. MARTIN, a citizen of the United States, residing at Hopewell Junction, Dutchess county, in the State of New York, have invented certain new and useful Improvements in Power-Transmitting Attachments for Automobiles, of which the following is a full, clear, and exact specification.

This invention relates to devices for the transmission of power, and more especially to devices of this character adapted to be used in connection with automobiles by means of which the engine of the automobile may be employed for winding drums, winches and for operating any form of machinery requiring the use of power.

One of the objects of the invention is to provide a device which is applicable to any automobile having an axle of the well known floating type.

Another object is to provide a device which may be quickly and easily attached and detached.

Another object is to provide a device which, when in use, will permit the rear wheels to remain on the ground, thereby avoiding the use of a jack.

Further objects are to provide a device which will be simple in its construction and operation; which will not be liable to get out of order, and which will be cheap to manufacture.

Other objects will be in part obvious and in part pointed out hereinafter.

In the accompanying drawings showing an illustrative embodiment of the invention and in which the same reference characters refer to similar parts in the several figures, Figure 1 is a view in elevation of the rear wheels of an automobile showing the power transmission device in position, parts being shown in section for the sake of clearness. Fig. 2 is an enlarged view, partly in section, showing the means for centering the transmission shaft in the wheel hub. Fig. 3 is a detail elevational view of the wheel hub, the centering means being removed. Fig. 4 is a detail view of one member of the centering means. Fig. 5 is a sectional view taken on the line 5—5 of Fig. 2.

Referring to the drawings, 10 represents the rear axle casing on which the wheels 11 are rotatably supported.

12 represents the differential gear casing within which is situated the differential gear by means of which the semi-axles and wheels are driven. As shown, this gear is of the usual type and comprises a main gear 13 which is driven by the main driving shaft and which is connected to idlers 14, 14, meshing with the beveled gears 15, 15, each of which is normally operatively connected to the inner end of one of the rear semi-axles. The axles are operatively connected to the wheels in the usual manner by toothed members keyed to the axles held in position by nuts $15^x$, and engaging other toothed members 16 rigidly secured to the wheels.

From the construction thus far described, which is old and well known, it will be understood that either of the semi-axles may be removed from the axle casing by merely unscrewing the nuts $15^x$ and removing the toothed member which is geared to the semi-axles, after which the latter may be drawn out of the casing.

The power transmission device which is adapted to be driven by the engine of the automobile, comprises a shaft 17, the inner end of which is adapted to be connected with both of the bevel gears 15, 15, of the differential gear, as is clearly shown in Fig. 1. The outer end of the shaft 17, which carries a pulley or other suitable transmission member 18, is journaled in a bearing or pillow block 19, the height of which is such that when the shaft 17 is in position the rear wheels 11 may remain on the ground. In order to center the shaft 17, a sleeve 20 is employed which is slipped over the shaft and which is provided with teeth 21 on its inner end adapted to engage with the teeth on the member 16. The sleeve 20 is held against longitudinal movement by a centrally perforated nut 22 which slips over the sleeve and is attached to the member 16 in a manner similar to that by which the nut $15^x$ is attached. The sleeve 20 is preferably provided with an oil cup 23 for lubricating the shaft 17.

The attaching of the transmission device for use, which should be largely obvious from the above description, is as follows:—When it is desired to operate the drum, which, or other machinery, one of the semi-axles, for example the right hand one as shown in Fig. 1, is removed as above described, and the other semi-axle is also removed, or as shown in the figure, simply withdrawn sufficiently to cause its inner end to move out of engagement with its co-acting bevel gear 15. The centering sleeve 20 and nut 22 are then placed in position as described and as clearly shown in Fig. 2, after which the shaft 17 is inserted through the sleeve 20 and axle casing 10 with its inner end engaging both of the bevel gears 15, 15, and its outer end journaled in the bearing 19. The pulley or other transmission member 18 is then belted or otherwise connected with the desired machinery, which will be driven when the engine of the automobile is operated. When it is again desired to use the automobile as a vehicle, it is merely necessary to remove the shaft 17 and its centering means 20, and 22, and replace the semi-axles which have been entirely or partially removed, after which the toothed members which are keyed to the axles and the nuts 15ˣ are placed in position.

It will be understood from the above description that the power transmission device is driven through the usual transmission gearing, which is positioned between the engine and the differential gears and that, therefore, the shaft 17 may be run at different speeds. By so constructing the device that the wheels may remain on the ground, it is merely necessary to block the same to prevent any accidental movement of the automobile, and the use of a jack with the consequent danger of the vehicle slipping therefrom during the operation of the device is obviated.

Having described this invention in connection with the illustrative embodiment thereof, to the details of which disclosure the invention is not of course to be limited, what is claimed as new and what is desired to be secured by Letters Patent is set forth in the appended claims.

I claim—

1. In combination with the differential gear, a pair of removable semi-axles and driving wheels of an automobile, a shaft of greater length than either of said semi-axles and adapted to have its inner end operatively connected with said gear, and a transmission member carried by said shaft outside of said wheels and adapted to rotate independently of said driving wheels, one of said driving wheels serving as a support for said shaft.

2. In combination with the differential gear, a pair of removable semi-axles and driving wheels of an automobile, a shaft of greater length than either of said semi-axles and adapted to have its inner end operatively connected with said gear, a bearing for the outer end of said shaft, and a transmission member carried by said shaft outside of said wheels and adapted to rotate independently of said driving wheels, one of said driving wheels serving as a support for said shaft.

3. In combination with the differential gear and driving wheels of an automobile, said differential gear comprising a driven gear and a pair of beveled gears engaging therewith, a shaft adapted to have its inner end operatively connected with both of said beveled gears, and a transmission member carried by said shaft outside of said wheels and adapted to rotate independently of said driving wheels, one of said driving wheels serving as a support for said shaft.

4. In combination with the rear axle casing of an automobile, a differential gear, a pair of removable semi-axles and driving wheels, a shaft of greater length than either of said semi-axles and adapted to be positioned within said casing and having its inner end operatively connected with said differential gear, the outer end of said shaft extending beyond the outer end of said casing, and a transmission member carried by said shaft adjacent its outer end extending beyond the end of said casing and adapted for rotation independently of said driving wheels.

5. In combination with the rear axle casing of an automobile, a differential gear, a pair of removable semi-axles, a shaft of greater length than either of said semi-axles and adapted to be positioned within said casing and having its inner end operatively connected with said differential gear, the outer end of said shaft extending beyond the outer end of said casing, means for centering the outer end of said shaft with respect to said casing, and a transmission member carried by said shaft adjacent its outer end, and beyond the outer end of said casing.

6. In combination with the rear axle casing of an automobile, a differential gear, a shaft adapted to be positioned within said casing and having its inner end operatively connected with said differential gear, the outer end of said shaft extending beyond the outer end of said casing, a bearing for the outer end of said shaft, and a transmission member carried by said shaft between said bearing and the outer end of said casing.

7. In combination with the rear axle casing of an automobile, a differential gear, a pair of removable semi-axles a wheel rotatably supported by said casing adjacent its outer end, a shaft of greater length than either of said semi-axles and extending through said wheel and within said casing and having its inner end operatively connected with said differential gear, the outer end of said shaft extending beyond said wheel, and a transmission member carried by said shaft, upon the portion thereof extending beyond said wheel.

8. In combination with the rear axle casing of an automobile, a differential gear, a wheel rotatably supported by said casing adjacent its outer end, a shaft extending through said wheel and within said casing and having its inner end operatively connected with said differential gear, the outer end of said shaft extending beyond said wheel, a bearing for the outer end of said shaft, and a transmission member carried by said shaft and positioned between said wheel and said bearing.

9. In combination with the rear axle casing of an automobile, a differential gear, a pair of removable semi-axles a wheel rotatably supported by said casing adjacent its outer end, a shaft of greater length than either of said semi-axles and extending through said wheel and within said casing and having its inner end operatively connected with said differential gear, the outer end of said shaft extending beyond said wheel, a transmission member carried by said shaft upon the portion extending beyond said wheel and means for centering said shaft relatively to said wheel.

10. In combination with the rear axle casing of an automobile, a differential gear, a wheel rotatably supported by said casing adjacent its outer end, said wheel being provided with a toothed member, a shaft extending through said wheel and within said casing and having its inner end operatively connected with said differential gear, the outer end of said shaft extending beyond said wheel, a transmission member carried by said shaft upon the portion extending beyond said wheel, a toothed centering sleeve surrounding said shaft and engaging said toothed member, and means for holding said sleeve in position.

Signed at the city of New York, county of New York, in the State of New York, this 17th day of January, nineteen hundred and twelve.

WILLIAM A. MARTIN.

Witnesses:
 CONRAD A. DIETERICH,
 LOUIS B. HASBROUCK.